Patented Oct. 28, 1941

2,260,420

UNITED STATES PATENT OFFICE 2,260,420

COATING COMPOUND

George H. Young, Pittsburgh, Pa., assignor to Stoner-Mudge, Inc., a corporation of Pennsylvania No Drawing. Application October 15, 1938, Serial No. 235,164

5 Claims. (Cl. 260—84)

This invention relates to coating compounds capable of forming protective coatings upon the surfaces of other bodies, and consists specifically in a coating compound composed primarily of those resinous polymeric compounds that result from the conjoint or simultaneous polymerization of vinyl chloride and the aliphatic esters of either or both acrylic and methacrylic acid. These thermoplastic conjoint polymers are known to the art, and usually contain a greater proportion of vinyl chloride than of ester, but my invention serves equally well when dealing with conjoint polymers that contain even a small proportion of vinyl chloride.

Vinyl chloride is a chemical compound that corresponds to the formula $CH_2=CHCl$. It may be derived by the action of hydrogen chloride on acetylene under the proper conditions of reaction and in the presence of any of a number of catalysts, as is well known; it may be derived from ethylene chlorhydrin under well-known reaction conditions, by the chemical removal of the elements of water; it may be derived from ethylene dichloride or from ethylidine dichloride by well-known reaction conditions involving the removal of hydrogen chloride. In the resinous products contemplated in this invention, vinyl chloride derived from all of these illustrative processes has been shown to serve equally well. The use of vinyl chloride in the production of thermoplastic conjoint polymers is not new.

The aliphatic esters of acrylic acid and of methacrylic acid are well known. They may result from direct esterification of acrylic acid or methacrylic acid with the desired aliphatic alcohol. The alcohol may be any one of the class of monohydroxy alcohols that comprises methyl alcohol, ethyl alcohol, normal and isopropyl alcohols, the several butyl alcohols, amyl alcohols, and so on. Further, these aliphatic esters may result from a dehydrating reaction on the corresponding alpha hydroxy esters, as is well known. In any case, the aliphatic acrylic esters that enter into the conjoint polymers contemplated in my invention are equally satisfactory, regardless of the source from which they are derived. They may be generally represented by the formula $CH_2=CXCOOR$, in which R is a substance selected from a group consisting of the aliphatic alkyl homologous series, methyl, ethyl, normal and isopropyl, the butyls, the amyls, and the higher alkyl radicals, and X is either hydrogen or the methyl radical.

Summarizing, the conjoint polymers that are contemplated in my invention are those derived from the simultaneous polymerization of vinyl chloride, from whatever source derived, and the aliphatic esters of acrylic and methacrylic acid, from whatever source derived. In the ensuing claims I use the term "an acrylic acid" as inclusive of both acrylic and methacrylic acids; that is, by "an acrylic acid" I mean an acid whose aliphatic esters are responsive to the formula $CH_2=CXCOOR$, as defined above. The simultaneous polymerization may have been carried out in the presence or absence of catalysts, with or without the action of actinic light, and at normal, reduced, or elevated temperatures. The resulting thermoplastic conjoint resinous polymers, suitably dispersed in the usual ketone or lower ester solvents, thinned with the usual aromatic diluents, and containing varying proportions of added plasticizers of the phthalate, phosphate, citrate, sebacate, or succinate ester types, are the resinous compounds in the coating compositions which my invention contemplates.

My invention consists in the addition to such a resinous polymeric compound as those specified of a substance that will serve to impart thermal stability to a film consisting primarily of that compound. A film of the resinous copolymer of vinyl chloride and acrylate, lacking the modifying addition of my invention, will, when deposited upon metal, tend to decompose at relatively low temperatures. While the specific decomposition temperatures vary somewhat from metal to metal, if the film be as heavy as is usual for films of this nature (exceeding 5 milligrams per square inch), the actual temperatures upon particular metals will be found to be as follows:

| | °F. |
|---|---|
| Tin plate | 335–340 |
| Iron | 310–315 |
| Zinc | 290–295 |
| Copper | 340–350 |

In general, it is then necessary, when dealing with these substances, so to control the baking temperature that the temperature of decomposition be not attained. It will be obvious that this may require special adjustment of baking or force-drying equipment, depending upon the metal that is being coated at a particular time. Furthermore, in baking a coated metal object which itself is constructed from a plurality of metals, the baking temperature, correctly adjusted for one of the metals, may be incorrect for another, with the result either that the coating is decomposed upon that other metal (because the baking temperature has been too high), or that the coating is insufficiently adherent to that other metal (because the baking temperature has been too low). It is frequently true that the temperature of maximum adhesion to a particular metal lies above the temperature of thermal decomposition. In such ways the application of coatings containing these thermally unstable resins is limited.

It is, therefore, a matter of desirability, and specifically my object herein, so to increase the thermal stability of the resinous film compounded of polymeric vinyl chloride and acrylate that, when spread upon such metals as those named or upon other metals or materials, it will endure temperatures substantially higher than those noted without undergoing decomposition.

In United States Patent 2,130,924, for the joint invention of Arthur W. Johnson and myself, description is given of a type of thermal stabilizers for the resinous polymers and copolymers, derived from vinyl chloride and vinyl esters, known commercially as Vinylite. Generally stated, the resin-type substance with which we there were concerned consisted of any polymer, co-polymer, or polymeric mixture of the compound corresponding to the formula $CH_2=CHX$, in which X may be a halogen, the hydroxyl group, acetoxyl, propionoxyl, or in general any monocarboxylic acyloxyl group; and, specifically, we found suited to our purpose those resinous products resulting from the simultaneous polymerization of vinyl chloride and vinyl acetate. The type of thermal stabilizer that we there described was a "tar base," consisting of the higher pyridine base homologs boiling above 240° C. at atmospheric pressure. In Letters Patent of the United States No. 2,169,717, granted Aug. 15, 1939, I have described another class of thermal stabilizers for the resinous vinyl polymers, consisting of the quinoline and isoquinoline alkaloid bases, and particularly the cinchona alkaloid bases. In Letters Patent of the United States No. 2,208,216, granted July 16, 1940, the joint inventors, of whom I am one, claim a broader field of invention, and within this broader field the inventions of the said Patent 2,130,924 and of the said Letters Patent 2,169,717 lie.

I have now found that, by adding to the resinous conjoint polymeric compounds derived from vinyl chloride and acrylate that are particularly described at the beginning of this specification a compound selected from the class consisting of the heterocyclic nitrogen bases that contain side-chain substituents and that have at least one double bond conjugated with respect to a double-bonded nitrogen in the parent heterocyclic ring system, an applied coating of the mixture possesses greatly increased thermal stability. The ring substituted nitrogen bases containing conjugated double-bond systems so added may be used either in the form of their pure compounds or as mixed concentrates, fractionated cuts, or basic residues derived from their synthetic preparation, or by extraction from heterocyclic nitrogen base containing natural products. I have found that this increase in thermal stability is noticeable upon the addition of even a trace of the above type of stabilizer, and for practical utilization a quantity of stabilizer not exceeding 4 per cent of the weight of the resinous conjoint polymeric compound serves to impart such stability that films deposited from the thermally stabilized coating composition can be baked at temperatures exceeding 365–375° F. or higher without suffering any thermal decomposition. In the typical formulations to be described below I have usually specified that the stabilizer concentration be 1 per cent of the weight of the resinous conjoint polymeric compound. Concentrations of stabilizer in this range or even lower I have found experimentally to yield stabilized solutions that can be baked at such temperature on most metals as to develop maximum adhesion without any thermal decomposition; and the coating possesses greatly increased gloss, toughness, and resistance to abrasion, moisture, atmospheric degradation, and other corrosive influences. Furthermore, with such stabilized coating composition it is possible to coat objects made from a plurality of dissimilar metals and thereafter to bake the coated object at a temperature such as to insure maximum adhesion to the most recalcitrant of the metals without suffering thermal decomposition on the other metals in the object.

I have described the type of heterocyclic nitrogen-base stabilizers contemplated in my invention, in a general way. Specifically, I mean compounds of the pyridine, quinoline, and isoquinoline type, of the acridine type, of the pyrazine type, of the pyrazole type, of the thiopyrazole type, or (in general) heterocyclic bases containing at least one double-bonded ring nitrogen conjugated with a double bond outside the parent ring. Thus, I have found that the "tar bases," or higher pyridine base homologs, boiling above 240° C. at atmospheric pressure, that occur naturally in coal tar, natural asphalts, water-gas pitch, bone pitch, and other tarry materials, will serve. I am able to add these tar bases either as isolated products, in the form of a purified pitchy wax containing the bases, or in the form of the crude pitch. Similarly, I have found that any compound selected from the class known as the quinoline and isoquinoline alkaloid bases, and particularly from the cinchona alkaloid bases, will serve. The quinoline and isoquinoline alkaloid bases constitute a particular sub-class within the general class of heterocyclic nitrogen bases which I have found to serve as thermal stabilizers. Thus, I have employed with success isoquinine, hydroquinine, quinidine, cinchonine, cinchonidine, quinoidine, cinchona febrifuge, and crude apoquinine bases. I have found none that is not serviceable to achieve thermal stabilization, and my experimentation indicates that all of the cinchona alkaloids, pure and impure, single and mixed, and their intermediate products of controlled decomposition by acid, such as quinicine, cinchonatoxine, isoquinotoxine, and the like, are so serviceable. Finally, I have demonstrated that other miscellaneous heterocyclic bases, responding to the limitations defined above under my generalized description of the class of nitrogen-base stabilizers, are also serviceable. Thus, I have employed with success tripyridyl, isophrophthalone, alpha - pyridyl - o - hydroxy phenyl ethylene, stilbazole, alpha-pyridyl furyl ethylene, alpha-benzopyridyl - o - p - dihydroxy phenyl ethylene, and alpha-pyrazyl-o-hydroxy-phenyl ethylene. I have found no compound responding to the generalized formula which I give below that is not, in greater or less degree, serviceable.

The general formula for the type of stabilizing compounds of the invention is as follows:

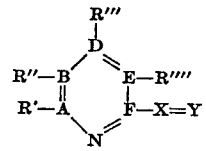

In this formula N is nitrogen; X may be any tri- or tetra-valent element capable of entering into a double-bonded system, and typically may be carbon or nitrogen; Y may be any di-, tri-, or tetra-valent element capable of entering into a double-bonded system together with X, and typically may be carbon, nitrogen, or oxygen. R', R'', R''' and R'''' may be simply hydrogen, or any other aliphatic or aromatic hydrocarbon radical; similarly R' and R'', and R''' and R'''' may be joined together by chemical bonds to form a condensed ring system; also R'''' and Y may be joined together to form a condensed ring system except in the special case when Y is oxygen. Further, A, B, D, E, and F typically may be carbon atoms, or one or more may be another element, such as nitrogen, capable of entering into a ring system and of bonding to side chains shown in the above generalized formula as R', R'', R''' and R''''. In a special case, oxygen or sulphur may be a member of the ring, in which case, there will be no attached side group on that atom.

*Specific examples*

(1) To 100 grams of the resinous copolymer of vinyl chloride and acrylate described above are added 2 grams of tripyridyl, and the whole is brought into solution in a mixture consisting of 4 parts of mesityl oxide and 1 part of toluol, the total concentration of solids being typically 15 per cent by weight of the whole. This stabilized coating compound may be spread upon tinplate, for example, at the usual coating thicknesses and thereafter baked at temperatures approximating 375° F. without noticeable thermal decomposition.

(2) To 100 grams of the resinous copolymer of vinyl chloride and acrylate described above, suitably dispersed in a solvent mixture consisting of 3 parts of mesityl oxide, 1 part of methyl isobutyl ketone, and 1 part of toluol, at a concentration of 15 per cent solids, is added 1 gram of isopyrophthalone. This stabilized coating compound may be spread upon iron, for example, and thereafter baked at temperatures approximating 350° F. without noticeable thermal decomposition.

(3) To 100 grams of the resinous copolymer of vinyl chloride and acrylate described above, and dispersed in a suitable solvent mixture such as is described under Example 2, are added 2 grams of alpha-pyridyl-o-hydroxy phenyl ethylene. This stabilized coating compound may be spread upon tin plate, for example, and thereafter baked at temperatures approximating 375° F. without noticeable thermal decomposition.

(4) To 100 grams of the resinous copolymer of vinyl chloride and acrylate described above are added 2 grams of stilbazole, and the whole is dispersed in a suitable solvent mixture, such as that described in Example 1. This stabilized coating compound may be spread upon iron, for example, and thereafter baked at temperatures approximating 340° F. without noticeable thermal decomposition.

(5) To 100 grams of the resinous copolymer of vinyl chloride and acrylate described above are added 2 grams of alphapyridyl furyl ethylene, and the whole is dispersed in a suitable solvent mixture, such as that described in Example 2. This stabilized coating compound may be spread upon copper, for example, and thereafter baked at temperatures approximating 380° F. without noticeable thermal decomposition.

(6) To 100 grams of the resinous copolymer of vinyl chloride and acrylate described above are added 2 grams of alpha-benzopyridyl-p-chlorophenyl ethylene and the whole is dispersed in a suitable solvent mixture, such as that described in Example 1. This stabilized coating compound may be spread upon zinc, for example, and thereafter baked at temperatures approximating 325° F. without noticeable thermal decomposition.

(7) To 100 grams of the resinous copolymer of vinyl chloride and acrylate described above are added 0.5 gram of quinicine, and the whole is dispersed in a suitable solvent mixture, such as that described in Example 2. This stabilized coating compound may be spread upon tinplate, for example, and thereafter baked at temperatures approximating 375° F. without noticeable thermal decomposition.

(8) To 100 grams of the resinous copolymer of vinyl chloride and acrylate described above are added 0.5 gram of cinchonicine, and the whole is dispersed in a suitable solvent mixture, such as that described in Example 2. This stabilized coating compound may be spread upon tinplate, for example, and thereafter baked at temperatures approximating 375° F. without noticeable thermal decomposition.

(9) To 100 grams of the resinous copolymer of vinyl chloride and acrylate are added 2 grams of alpha-pyrazyl-o-hydroxy phenyl ethylene, and the whole is dispersed in a suitable solvent, such as that described in Example 2. This stabilized coating compound may be spread upon iron, for example, and thereafter baked at temperatures approximating 340° F. without noticeable thermal decomposition.

(10) To 100 grams of the resinous copolymer of vinyl chloride and acrylate described above is added 1 gram of quinine, and the whole is dispersed in a suitable solvent, such as mesityl oxide. This stabilized coating compound may be spread upon tinplate, for example, and thereafter baked at temperatures approximating 380° F. without noticeable thermal decomposition.

(11) To 100 grams of the resinous copolymer of vinyl chloride and acrylate described above is added 1 gram of quinoidine, and the whole is dispersed in a solvent mixture consisting of 4 parts of mesityl oxide and 1 part of isophorone. This stabilized coating compound may be spread upon tinplate, for example, and thereafter baked at temperatures approximating 385° F. without noticeable thermal decomposition.

(12) To 100 grams of the resinous copolymer of vinyl chloride and acrylate described above is added 1 gram of cinchona febrifuge, and the whole is dispersed in a suitable solvent, such as isophorone, the total concentration of solids being typically 15 per cent of the weight of the whole. This stabilized coating compound may be spread upon iron, for example, and thereafter baked at temperatures approximating 340° F. without noticeable thermal decomposition.

(13) To 100 grams of the resinous copolymer of vinyl chloride and acrylate described above is added 1 gram of cinchonidine, and the whole is dispersed in a solvent mixture consisting of 1 part of methyl ethyl ketone, 3 parts of mesityl oxide, and 1 part xylene, the total concentration of solids being typically 10 per cent of the weight of the whole. This stabilized coating compound may be spread upon tinplate, for example, and thereafter baked at temperatures approximating 375° F. without noticeable thermal decomposition.

(14) To 100 grams of the resinous copolymer of vinyl chloride and acrylate described above are added 2 grams of technical quinoline, and the whole is dispersed in a suitable solvent mixture, such as that described in Example 11. This stabilized coating compound may be spread upon tinplate, for example, and thereafter baked at temperatures approximating 400° F. without noticeable thermal decomposition.

(15) To 100 grams of the resinous copolymer of vinyl chloride and acrylate described above is added 1 gram of a coal tar pitch containing at least one tar base boiling above 240° C. at atmospheric pressure, and the whole is dispersed in a typical solvent mixture consisting of 4 parts of mesityl oxide, 1 part of xylene, and ⅕ part of dibutyl phthalate, the total concentration of solids being typically 12 per cent of the weight of the whole. This stabilized coating compound may be spread upon tinplate, for example, and thereafter baked at temperatures approximating 400° F. without noticeable thermal decomposition.

(16) To 100 grams of the resinous copolymer of vinyl chloride and acrylate described above are added 2 grams of natural asphalt, and the whole is dispersed in a solvent mixture consisting of 2 parts of mesityl oxide, 2 parts of isophorone, 1 part of hiflash naphtha, and ⅕ part of dibutyl cellosolve phthalate, the total concentration of solids being typically 10 per cent of the weight of the whole. This stabilized coating compound may be spread upon tinplate, for example, and thereafter baked at temperatures approximating 400° F. without noticeable thermal decomposition.

(17) To 100 grams of the resinous copolymer of vinyl chloride and acrylate described above are added 4 grams of "tar wax," being a waxy commercial extract of the higher tar bases occurring in coal tar pitch. The whole is then dispersed in a solvent mixture consisting of 5 parts of mesityl oxide and ⅕ part of liquid chlorinated diphenyl, the total concentration of solids being typically 15 per cent of the weight of the whole. This stabilized coating compound may be spread upon tinplate, for example, and thereafter baked at temperatures approximating 385° F. without noticeable thermal decomposition.

(18) To 100 grams of the resinous copolymer of vinyl chloride and acrylate described above is added 1 gram of water-gas pitch, and the whole is brought into solution in a suitable solvent mixture such as that described in Example 17. This stabilized coating compound may be spread upon iron, for example, and thereafter baked at temperatures approximating 345° F. without noticeable thermal decomposition.

(19) To 100 grams of the resinous copolymer of vinyl chloride and acrylate described above are added 5 grams of coal tar pitch, and the whole is brought into solution in a solvent mixture which consists of 3 parts of mesityl oxide, 1 part of isophorone, 1 part of methyl normal propyl ketone, ½ part of hiflash naphtha, and ⅕ part of tricresyl phosphate. The total concentration of solids may be typically 15 per cent of the whole. This stabilized coating compound may be spread upon tinplate, for example, and thereafter baked at temperatures approximating 400° F. without noticeable thermal decomposition.

In the above examples I have given typical stabilized coating compositions, and it will be understood that the concentrations of stabilizer specified are preferred, but not limiting, concentrations. If crude pitches or pitch-derived waxes be employed they should be used in proportion to their content in cyclic nitrogen-base compounds. It may be explained that in the case of crude pitch, and pitch-derived waxes, a large proportion of the content constitutes for my purpose merely a pitchy diluent for the tar base or bases supplied to the coating. For reasons of availability, however, it may under certain circumstances be desirable to utilize a crude pitch or pitch-derived wax, rather than to add technical quinoline or other cyclic nitrogen bases in separated or purified condition.

As an alternative to admixture of the thermal stabilizing material to the resin in solution, it may in any of its forms be milled in with the solid resin. Quantitatively there is no fixed upper limit to the percentage inclusion of the thermal stabilizer with the resin. Within reasonable limits, it is a fact that the increase in thermal stability attendant upon its use is proportional to the amount of stabilizer added. There are, of course, practical limits to the inclusion of the stabilizer in any of its forms. Thus, it is obvious that the coal-tar pitch, for example, should not be added in such larger proportion that the coating becomes a pitchy coating rather than a resin film, and it is equally true that there would be no advantage in attempting to carry the endurable temperature to such point that the thermal stabilizing agent would itself decompose.

Having described fully my discovery, and having shown the advantages attendant with its use, I claim as my invention:

1. A thermally stabilized coating compound consisting of a conjoint polymer derived from the simultaneous polymerization of vinyl chloride and an ester responding to the formula

in which X is a member of the group consisting of hydrogen and the methyl radical, and R is a member of the group consisting of the methyl, ethyl, propyl, butyl, and higher homologous alkyl radicals, and a stabilizer consisting of quinoidine, such stabilizer being present in a ratio not to exceed 4 parts of quinoidine to 100 parts of the first named substance.

2. A thermally stabilized coating compound consisting of a conjoint polymer derived from the simultaneous polymerization of vinyl chloride and ethyl methacrylate, and a stabilizer consisting of quinoidine, such stabilizer being present in a ratio not to exceed 4 parts of quinoidine to 100 parts of the first named substance, the whole being dispersed in a solvent.

3. A thermally stabilized coating compound consisting of a conjoint polymer derived from the simultaneous polymerization of vinyl chloride and a lower aliphatic ester of an acrylic acid, and a heterocyclic nitrogen base stabilizer selected from a group consisting of tripyridyl, isopyrophthalone, α-pyridyl-o-hydroxy phenyl ethylene, stilbazole, α-pyridyl furyl ethylene, α-benzopyridyl-p-chlorophenyl ethylene, quinicine, cinchonicine, α-pyrizyl-o-hydroxy phenyl ethylene, quinine, quinoidine, cinchona febrifuge, chinchonidine, such stabilizer being present in a ratio not to exceed four parts of the stabilizing base to one hundred parts of the first-named substance, the whole being dispersed in a solvent.

4. A thermally stabilized coating compound consisting of a conjoint polymer derived from the simultaneous polymerization of vinyl chloride and ethyl methacrylate, and a heterocyclic nitrogen base stabilizer selected from a group consisting of tripyridyl, isopyrophthalone, α-pyridylo-hydroxy phenyl ethylene, stilbazole, α-pyridyl furyl ethylene, α-benzopyridyl-p-chlorophenyl ethylene, quinicine, cinchonicine, α-pyrizyl-o-hydroxy phenyl ethylene, quinine, quinoidine, cinchona febrifuge, cinchonidine, such stabilizer being present in a ratio not to exceed four parts of the stabilizing base to one hundred parts of the first named substance, the whole being dispersed in a solvent.

5. A thermally stabilized coating compound consisting of a conjoint polymer derived from the simultaneous polymerization of vinyl chloride (80%) and methyl acrylate (20%) and a heterocyclic nitrogen base stabilizer selected from a group consisting of tripyridyl, isopyrophthalone, α-pyridyl-o-hydroxy phenyl ethylene, stilbazole, α-pyridyl furyl ethylene, α-benzopyridyl-p-chlorophenyl ethylene, quinicine, cinchonicine, α-pyrizyl-o-hydroxy phenyl ethylene, quinine, quinoidine, cinchona febrifuge, cinchonidine, such stabilizer being present in a ratio not to exceed four parts of the stabilizing base to one hundred parts of the first-named substance, the whole being dispersed in a solvent.

GEORGE H. YOUNG.